United States Patent [19]
Benway

[11] Patent Number: 5,992,135
[45] Date of Patent: Nov. 30, 1999

[54] DISCHARGE CHUTE SUPPORT MEMBER

[75] Inventor: Randy Edward Benway, Horicon, Wis.

[73] Assignee: Deere & Company, Moline, Ill.

[21] Appl. No.: 08/987,884

[22] Filed: Dec. 8, 1997

[51] Int. Cl.[6] .................................................. A01D 67/00
[52] U.S. Cl. .......................................... 56/320.2; 56/200
[58] Field of Search .................... 56/320.2, 199, 56/200, 202, 203, DIG. 20

[56] References Cited

U.S. PATENT DOCUMENTS

| | | | |
|---|---|---|---|
| 3,099,123 | 7/1963 | Price | 56/320.2 |
| 3,673,778 | 7/1972 | Ramey | 56/320.2 |
| 3,706,190 | 12/1972 | Taub | 56/320.2 |
| 3,760,572 | 9/1973 | Marion et al. | 56/320.2 |
| 3,797,214 | 3/1974 | Erdman et al. | 56/320.2 |
| 3,805,499 | 4/1974 | Woelffer et al. | 56/320.2 |
| 4,008,559 | 2/1977 | Lessig, III et al. | 56/320.2 |
| 4,041,682 | 8/1977 | Kidd | 56/320.2 |
| 4,047,367 | 9/1977 | Thorud | 56/320.2 |
| 4,158,279 | 6/1979 | Jackson | 56/202 |
| 4,726,178 | 2/1988 | Mallaney et al. | 56/202 |
| 4,882,898 | 11/1989 | Samejima et al. | 56/208 |
| 5,003,757 | 4/1991 | Hill | 56/17.4 |
| 5,189,870 | 3/1993 | Hohnl | 56/320.2 |
| 5,195,311 | 3/1993 | Holland | 56/320.2 |

FOREIGN PATENT DOCUMENTS

| | | |
|---|---|---|
| 2 280 309 | of 0000 | France . |
| 2 331 508 | of 0000 | Germany . |

OTHER PUBLICATIONS

Photo of Murray Ultra 46" sub–chute with no spring or locking mechanism, on sale more than one year prior to filing the present invention.

*Primary Examiner*—Thomas B. Will
*Assistant Examiner*—Arpad Fabian Kovacs

[57] ABSTRACT

A support member mounted with a clippings conduit that channels grass clippings from a mower deck to a clippings collection container. The support member operatively supports a side discharge chute in its raised position across a significant portion of the chute such that the chute is hindered from deforming or warping when held in its upwardly pivoted position by abutment with the support member during operation in the clippings collection mode.

15 Claims, 6 Drawing Sheets

DISCHARGE CHUTE SUPPORT MEMBER

This invention relates to mower decks having side discharge chutes that are pressed against a clippings conduit that directs clippings into a bag or other container when operating the mower in a bagging mode.

Conventional mowers include a mower deck within which a plurality of mower blades rotate for cutting grass and other vegetation during operation. The mower deck often includes a side discharge outlet or opening formed in the side of the mower deck which allows clippings cut by the blades to exit the mower deck to the side for being deposited onto the turf. These mowers typically include a large plastic chute or shield that extends outwardly from the discharge outlet. The chute directs the cut materials downwardly into the turf, and helps prevent clippings and other objects from being thrown upwardly as they exit the mower deck. The chute is typically mounted to the mower deck by way of a hinge mechanism, and is often spring biased to a downward position. The hinge mechanism allows the chute to pivot upwardly when the chute comes in contact with an obstacle such as when mowing close alongside fences or buildings or when mowing around trees. The spring biases the chute back down to its original operating position after the chute is clear of the obstruction.

Some conventional mower decks can also be operated in a bagging mode wherein the clippings are directed into bags or other containers carried by the mowing vehicle. To convert the mower from the side discharge mode to the bagging mode, the chute is pivoted upwardly so that a clippings conduit or tube can be attached to the discharge outlet. During operation in the bagging mode clippings will exit the mower deck through the discharge outlet and travel into the tube where they are channeled rearwardly into a clippings collection container or bag. With the tube installed, the chute will continue to be biased toward its downward position by the action of the spring. The tube blocks the chute from returning completely to its original down position, and the chute is therefore pressed against the side of the tube by the force of the spring.

Some mowers are provided with a discharge outlet that extends up into the top wall of the mower deck. In the side discharge mode this portion of the discharge outlet is generally covered or closed by the presence of the chute positioned over the portion of the outlet in the top wall of the deck. When operating in the bagging mode the tube is attached directly to the opening in the top wall of the deck. The clippings are directed upwardly within the mower deck by the wings of the cutting blades that establish an updraft. By positioning the tube in this location, the clippings enter the tube with relatively high velocity, since the clippings are directed straight up through the tube by the force of the updraft within the mower deck. When operating in the bagging mode the chute will be biased toward the down position, and is typically held in its up position by abutment with the tube.

When operating in the bagging mode, the chutes of conventional mower decks are pressed against the clippings collection tubes by the force of the spring. The force imparted to the chute by abutment with the tube can cause the chutes to bend or deform as the chute is pressed against the tube. Many conventional chutes become warped after periods of operation in the bagging mode. Portions of these chutes are deflected or deformed upwardly, which, when the mower is again returned to the side discharge mode, may cause the chute to no longer function to direct clippings downwardly into the grass. Some deformed chutes are warped upwardly from their original shape which can undesirably allow clippings to be directed upwardly as they exit the discharge outlet. Clippings and other objects that are propelled upwardly by the mower might strike objects or persons in the vicinity.

It would therefore be desirable to provide a mower deck that is convertible between a side discharge mode and a bagging mode, and which includes a downwardly biased side discharge chute that directs clippings downwardly during operation in the side discharge mode. It would be desirable for such a mower to prevent or hinder the chute from becoming bent, deformed or warped when the side discharge chute is held in its up position during periods of operation in the bagging mode. It would be desirable for the chute to generally retain its original shape and continue to direct clippings and other objects downwardly into the turf as they exit the mower deck through the discharge outlet when the mower resumes operation in the side discharge mode.

SUMMARY OF THE INVENTION

The present invention provides a mower with a mower deck having a side discharge outlet through which clippings are expelled from the mower deck. In the side discharge mode a cover extends over and generally closes a top portion of the discharge outlet formed in the top wall of the mower deck. The cover blocks clippings from traveling straight upwardly through the top portion of the discharge outlet. A chute is also pivotally mounted with the mower deck to extend outwardly and to the side of the mower deck adjacent the discharge outlet. The chute directs clippings downwardly as they exit the mower deck via the discharge outlet such that the clippings and other materials are deposited onto the turf.

The mower is convertible to a bagging mode by pivoting the chute and cover upwardly and inserting a conduit into the discharge outlet. The conduit receives clippings from the discharge outlet and channels them into a clippings collection container carried by the vehicle. Extending outwardly from the side of the conduit is a support member that is adapted for abutting the cover during operation in the bagging mode. The cover is thereby held in its upwardly pivoted position by abutment with the support member. The chute is held in its upwardly pivoted position by abutment with the cover in its up position. The chute is pressed against the cover by a biasing spring that urges the chute to return to its downwardly pivoted position.

The cover is made of a rigid metal material that retains its shape when held up by the support member during the bagging mode of operation. The chute is made of a flexible plastic material and is held up by abutment with the cover during the bagging mode. The chute abuts the cover across a significant distance such that the load imparted to the chute by the cover is distributed and dispersed across or within the chute. This dispersal of load generally reduces the load encountered by any one portion of the chute, which helps prevent the chute from becoming deformed at any particular location when held in position during the bagging mode. The elimination of large concentrated loads encountered by the chute when held in its inoperative position during bagging operations helps the chute retain its original shape when it returns to the side discharge mode of operation. Because it will retain its original shape, the chute will continue to effectively direct clippings and other materials downwardly toward the ground as the clippings pass through the discharge outlet during operation in the side discharge mode.

An alternative embodiment of the present invention includes a conduit having a support member which directly abuts a side discharge chute. The support member has an elongated shape that allows the support member to abut the chute across a significant length for dispersing and distributing the force of the abutment throughout a large portion of the chute. This alternative embodiment eliminates large concentrated loads that otherwise might be encountered by the chute, and thereby reduces or eliminates the deformation of the chute when held in the bagging mode. The chute therefore generally retains its original shape and will function effectively when the mower is returned to the side discharge mode of operation.

DETAILED DESCRIPTION OF THE PREFERRED EMBODIMENT

Figure 1:
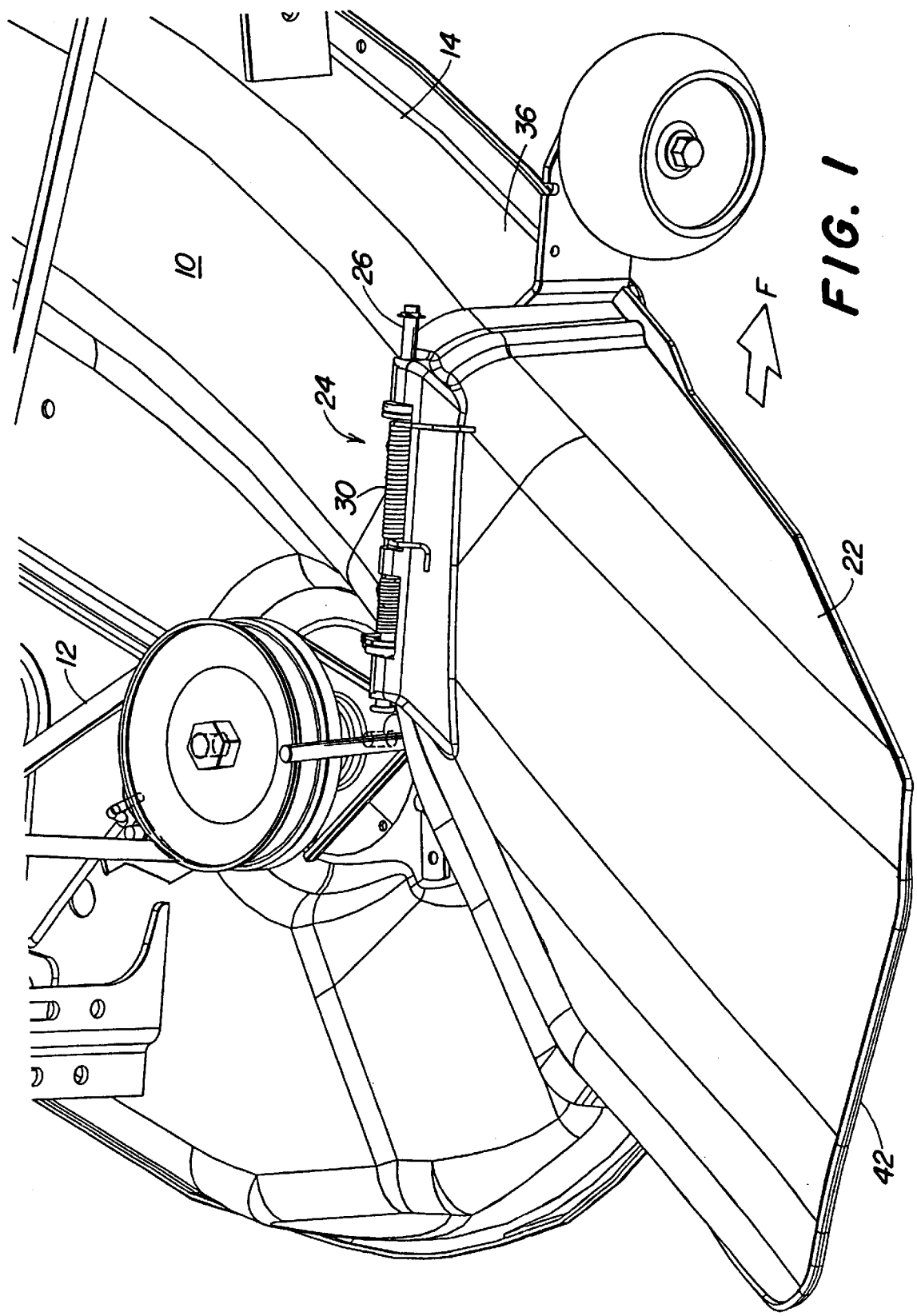
FIG. 1 shows a mower deck with which the present invention is adapted for use, showing a side discharge chute in a lowered position for directing clippings downwardly into the turf as they exit the side discharge outlet.

Referring now to FIGS. 1–5, there is shown the preferred embodiment of the present invention. A mower deck 10 is adapted to be suspended from a vehicle such as a lawn tractor. Mower blades rotate clockwise within the mower deck 10 for cutting grass and vegetation. The blades are driven by a belt drive system 12 that receives rotational power from an output shaft of the vehicle engine. The blades include leading cutting edges which cut the grass and other vegetation. Upturned wing portions of the blades are positioned behind the cutting edges and serve to create an updraft within the mower deck 10 that causes clippings to be blown upwardly and circulate within the front portion 14 of the deck 10 toward the right side of the deck 10 with respect to forward travel.

The mower deck 10 includes a discharge outlet 16 through which clippings exit the mower deck 10. The discharge outlet 16 includes a side portion 18 through which clippings travel during operation in the side discharge mode, and a top portion 20 through which clippings travel when operating in the bagging mode, as will be described in greater detail below.

Figure 3:
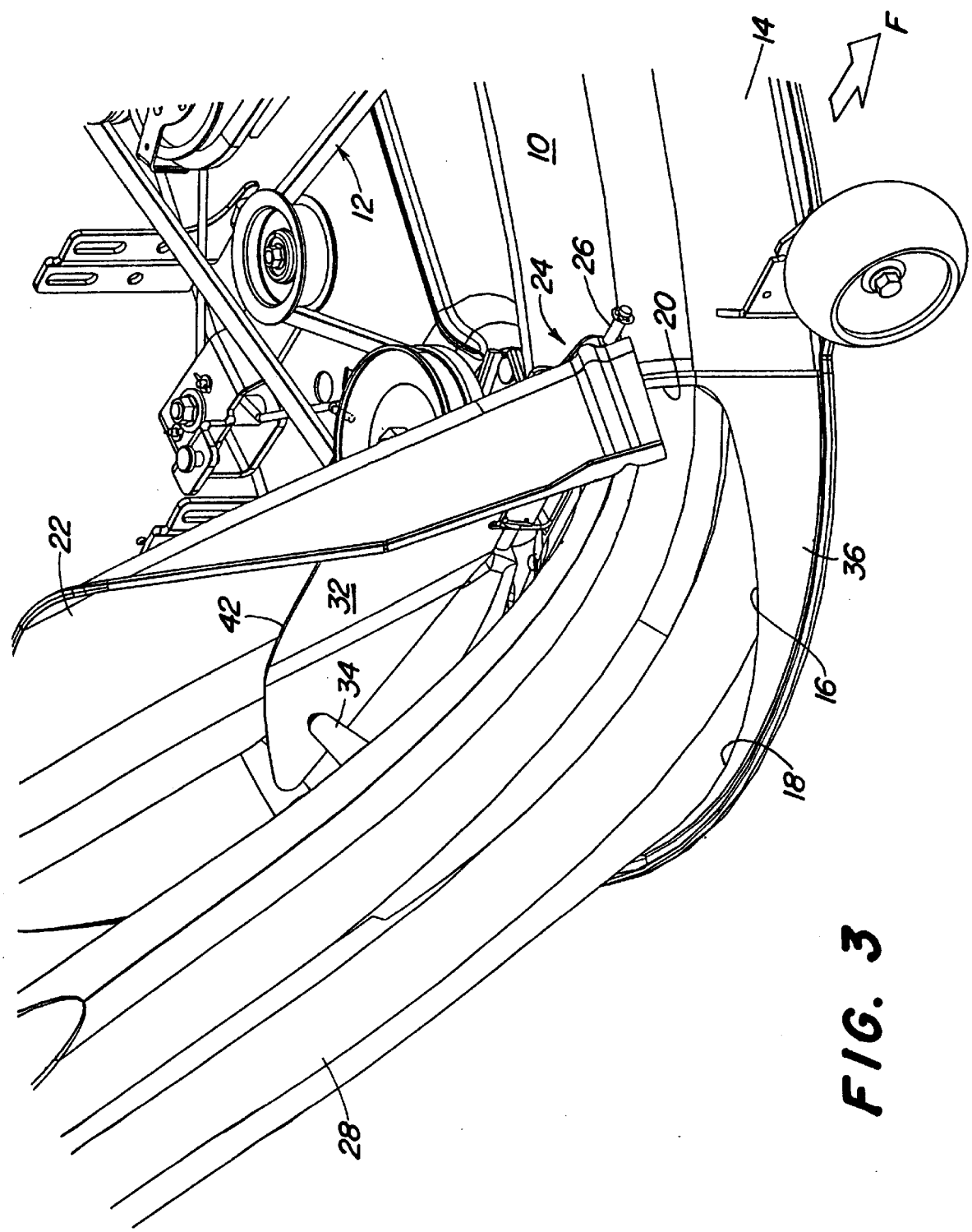
FIG. 3 shows a conduit installed in the discharge outlet of the mower deck, and shows a support member extending from the side of the conduit for supporting the cover and chute in their open positions.
Figure 4:
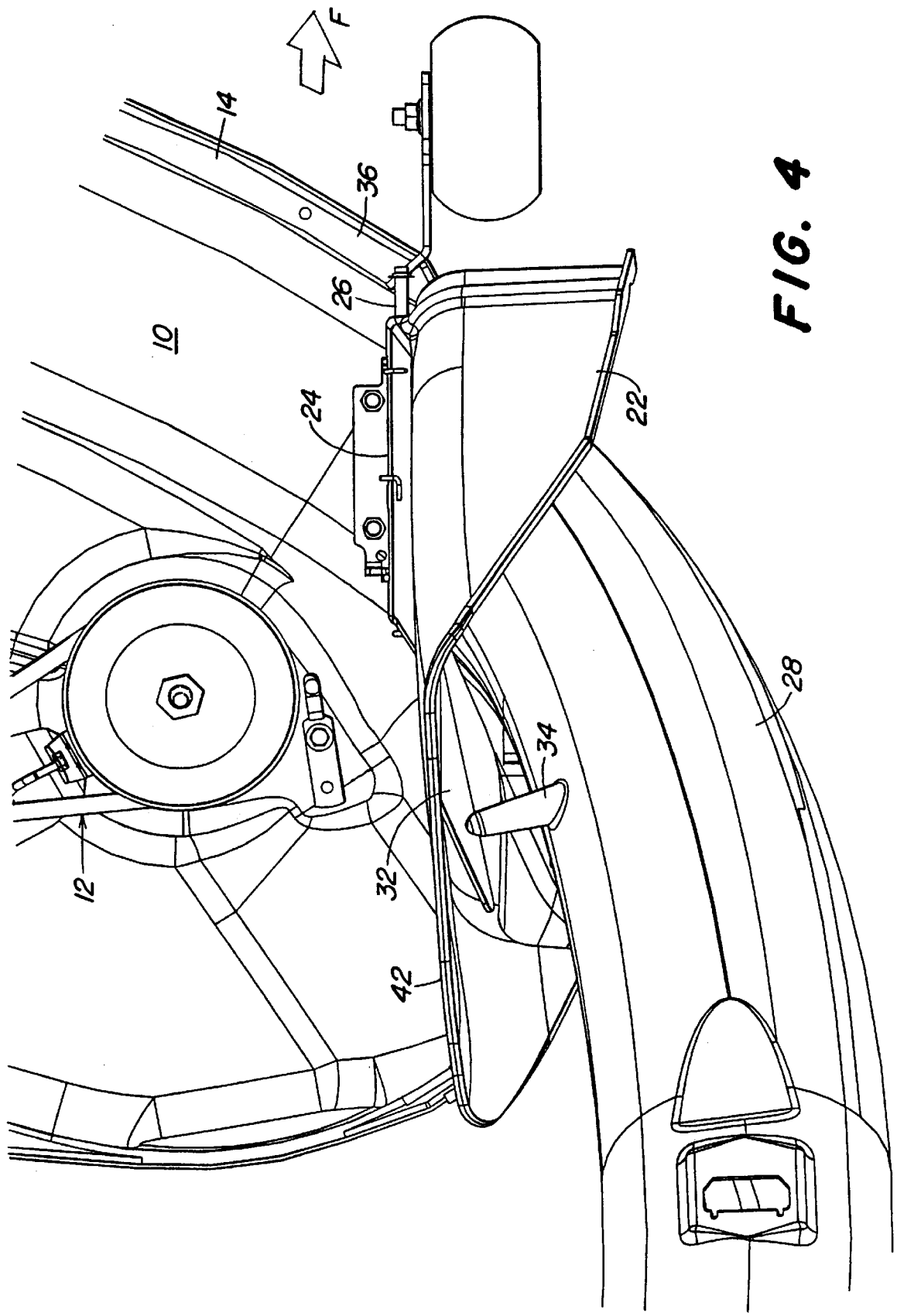
FIG. 4 is a top view of the mower deck with the conduit installed, showing the support member in abutment with the cover and the cover in abutment with the chute.
Figure 5:
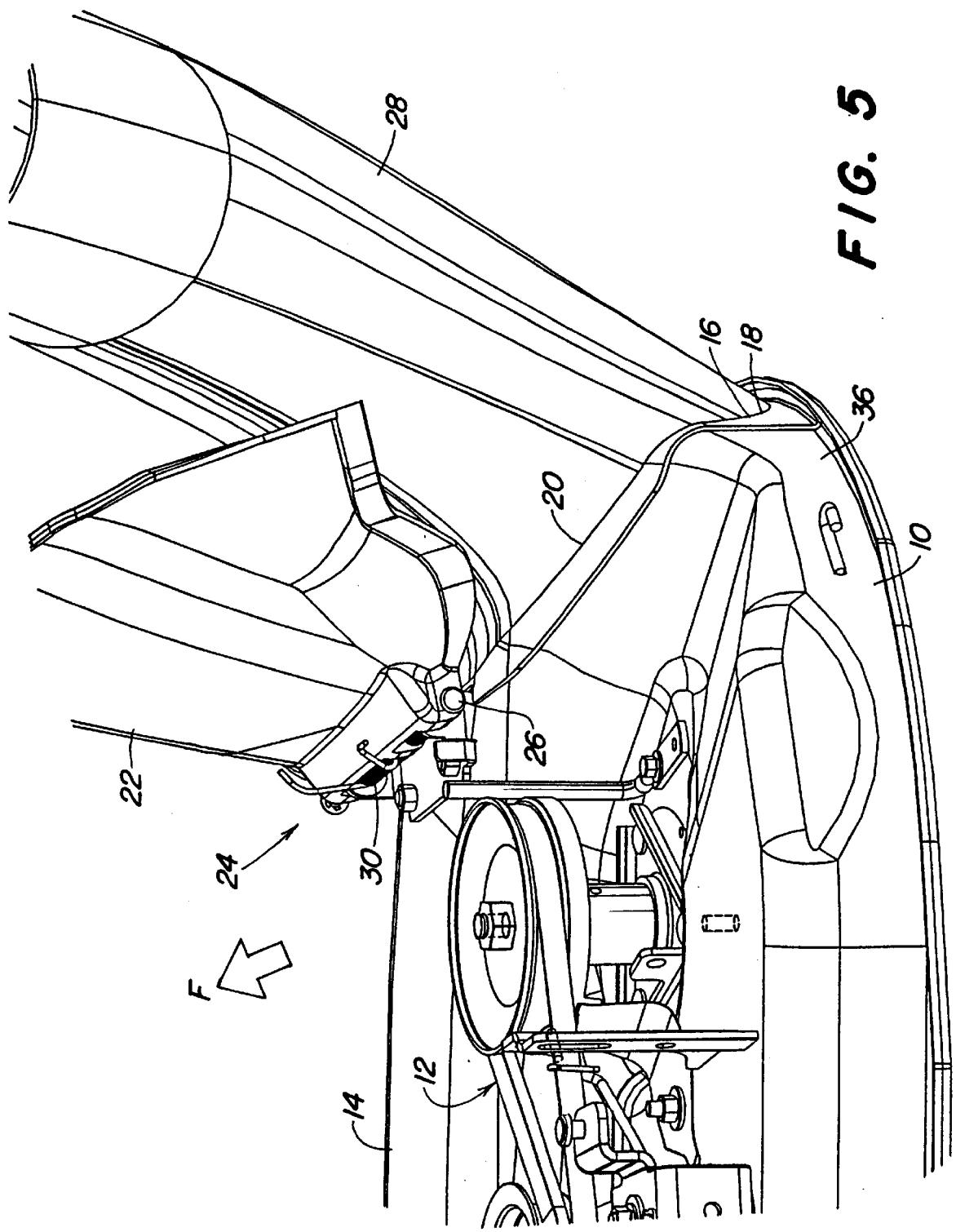
FIG. 5 is a view from the rear of the deck with the conduit installed in the discharge outlet.

A plastic chute 22 is provided proximate the discharge outlet 16. The chute 22 is coupled with the mower deck 10 by way of a hinge mechanism 24 that allows the chute 22 to pivot between first and second positions. In the first position the chute 22 is in a lowered position as shown in FIG. 1 whereat the chute 22 directs clippings downwardly into the turf as the clippings are propelled outwardly through the side portion 18 of the discharge outlet 16. In the first position the chute 22 blocks clippings and other objects from being thrown upwardly as they pass through the discharge outlet 16 during mowing operations in the side discharge mode. The hinge mechanism 24 establishes an axis 26 about which the chute 22 can pivot upwardly from the first position to a second position as shown in FIGS. 3–5 whereat the chute 22 provides clearance for a clippings conduit 28 to be installed into the discharge outlet 16. A biasing spring 30 engages the chute 22 and biases the chute 22 downwardly toward its first position.

Figure 2:
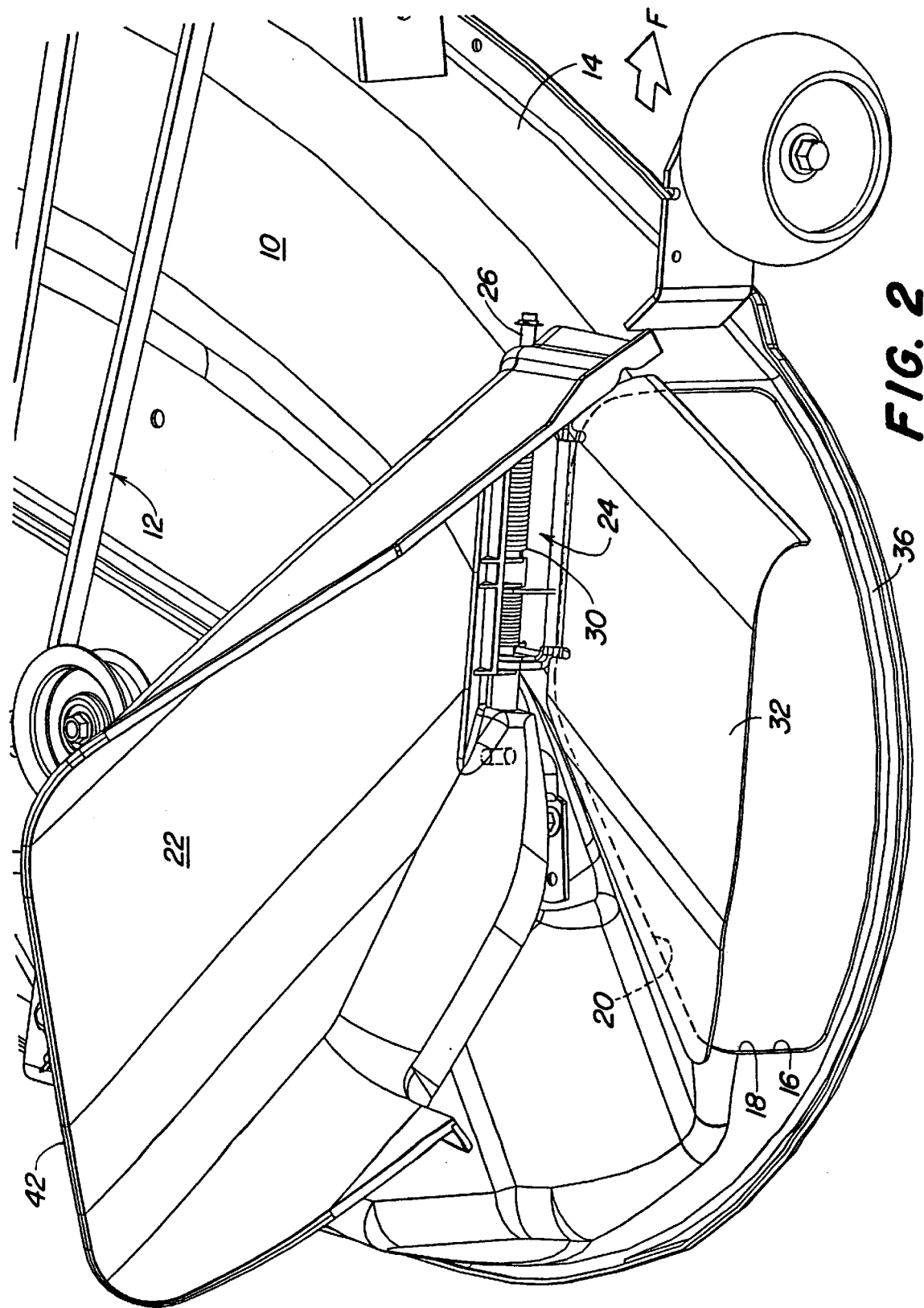
FIG. 2 shows the mower deck of FIG. 1 with the chute raised such as when the chute encounters an obstruction, and showing the cover which extends across the top portion of the discharge outlet.

A cover 32 is positioned directly beneath the chute 22 and extends across the top portion 20 of the discharge outlet 16 in the position shown in FIG. 2 when operating in the side discharge mode. The cover 32 has a first position shown in FIGS. 1 and 2 covering and generally enclosing the top portion 20 of the discharge outlet 16 during the side discharge mode, and a second position shown in FIGS. 3–5 pivoted up from the first position for generally exposing the top portion 20 of the discharge outlet 16 to provide clearance for the clippings conduit during the bagging mode of operation. The cover 32 is made of a relatively rigid metal material and is mounted to the mower deck 10 by way of the hinge mechanism 24. The cover, chute, hinge mechanism and biasing spring are described in detail in U.S. application Ser. No. 08/867,364, filed 2 Jun. 1997, which is hereby incorporated by reference.

A clippings conduit 28 is provided which can be installed into the discharge outlet 16 for converting the mower from the side discharge mode to a bagging mode. The clippings conduit 28 receives clippings through the top portion 20 of the discharge outlet 16 and directs them into a bag or other clippings collection container carried by the vehicle. A support member 34 extends outwardly from the clippings conduit 28. When installed in the discharge outlet 16 during the bagging mode of operation the cover 32 directly abuts and is held open by the support member 34. The chute 22 is biased downwardly toward its closed first position, and is held open by abutment with the cover 32 which is in turn held open by the support member 34, as described in greater detail below.

Next the operation of the present invention will be described in greater detail. During operation in the side discharge mode the cover 32 and chute 22 are in their first positions covering the top portion 20 of the discharge outlet 16, and the clippings conduit 28 is not attached to the mower deck 10. Grass is cut within the front portion 14 of the mower deck 10 by the clockwise rotating blades. Grass clippings cut in the front portion 14 of the deck 10 are directed upwardly and to the right side 36 of the mower deck 10 by the draft established by the wing portions of the mower blades. As the clippings travel to the right side 36 of the deck 10 they flow through the side portion 18 of the discharge outlet 16 and are deposited on the ground to the side of the deck 10. The cover 32 generally closes the top portion 20 of the discharge outlet 16 and prevents materials from being thrown upwardly through the top portion 20 of outlet 16. The chute 22 extends laterally outwardly to the side of the discharge outlet 16 and generally blocks or hinders clippings and other materials from being thrown upwardly as they exit the side portion 18 of the discharge outlet 16.

If the chute 22 contacts an obstruction during mowing operations, such as when mowing close alongside a building or around a tree, the hinge mechanism 24 allows the chute 22 to pivot upward as the chute 22 contacts the obstruction. The plastic material of the chute 22 allows the chute 22 to flex as obstructions are encountered. As the chute 22 pivots up in contact with the obstruction the cover 32 remains in place across the top portion 20 of the discharge outlet 16 for preventing clippings and other materials from flowing upwardly through the top portion 20 of the discharge outlet 16 while the chute 22 is in its raised position. Once the chute 22 is clear of the obstruction the biasing spring 30 helps return the chute 22 to its lowered position.

The mower can be converted from the side discharge mode to the bagging mode. To do so, the operator stops mowing operations and once the mower blades have stopped he lifts the cover 32 and chute 22 to their respective second positions. The conduit 28 is then inserted into the discharge outlet 16. The conduit 28 is operatively connected with a container such that the clippings exiting the mower deck 10 through the discharge outlet 16 are channeled through the conduit 28 into the container carried by the vehicle. When filled with clippings, the container can be emptied for disposal of the grass clippings.

During operation in the bagging mode the support member 34 which protrudes outwardly from the conduit 28 is in abutment with the cover 32. The cover 32 is thereby held in its open second position by the support member 34 fixed with the conduit 28. The cover 32 is made of metal material which is relatively rigid, and will retain its original shape while being held open by the support member 34. During the bagging mode, the chute 22 is pressed against the cover 32 by the force imparted to the chute 22 by the biasing spring 30. The chute 22 is therefore held open in its second position by abutment with the cover 32. The chute 22 shown in FIGS. 1–5 abuts the cover 32 across a significant length extending generally parallel with the axis of the hinge mechanism. The cover 32 abuts the chute 22 along generally the entire laterally outer edge 42 of the cover 32. The chute 22 is made of a plastic material that is somewhat flexible. The chute 22 is thereby allowed to flex when obstructions are struck. Since the chute 22 is held in its open second position by contact with the cover 32 across a significant distance or area, the load imparted to the chute 22 is distributed or dispersed across a wide enough area to generally prevent the chute 22 from deforming or warping while being held open. Because the chute 22 retains its original shape during the bagging mode, it will be in its original shape when the mower is returned to the side discharge mode. Therefore, when the chute 22 returns to its first position extending outwardly from the discharge outlet 16 as shown in FIG. 1, the chute 22 will be in a shape that is conducive to blocking materials from being thrown upwardly after exiting the discharge outlet 16. The chute 22 will therefore continue to direct clippings and other materials downwardly into the turf as they are discharged from the outlet 16 in the side discharge mode even after the chute 22 has been held up in its open second position during long periods of operation in the bagging mode.

The support member 34 shown in FIGS. 3–5 is formed integral with the conduit 28. The conduit 28 and support member 34 are both made of plastic, and the support member 34 is therefore formed in the same manufacturing operation that the conduit 28 is formed. This design therefore reduces the part count, reduces manufacturing and assembly costs, and generally simplifies the design.

Figure 6:
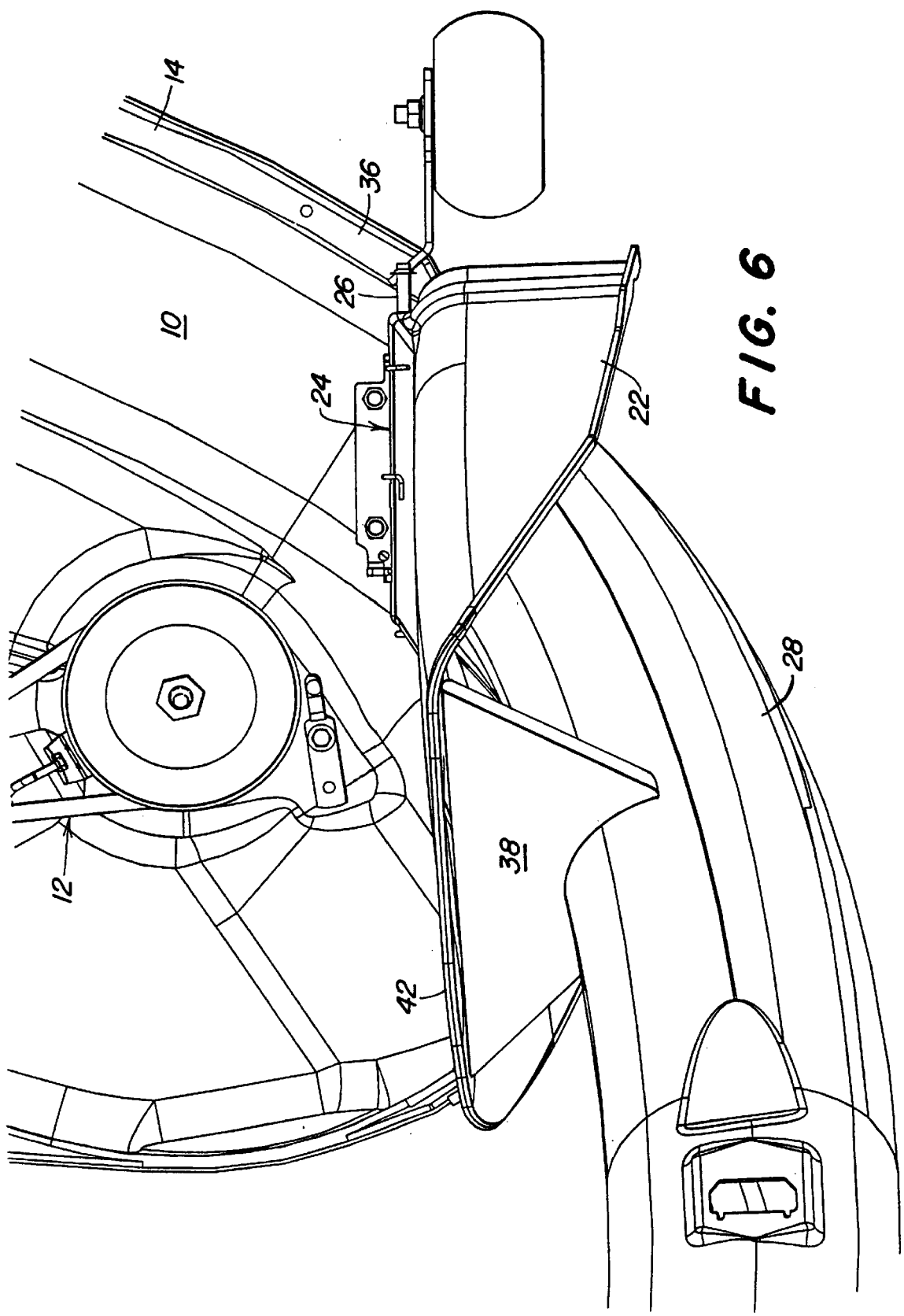
FIG. 6 shows an alternative embodiment of the present invention having a support member mounted with the conduit and that abuts the chute directly across a significant distance of the chute.

Referring now to FIG. 6, there is shown an alternative embodiment of the present invention. The support member 38 shown in FIG. 6 is adapted to abut the chute 22 directly. The support member 38 extends a significant distance generally in a horizontal plane for abutting the chute 22 along a plurality of points. By abutting the chute 22 across a significant distance in the manner shown in FIG. 6, the force transmitted from the support member 38 to the chute 22 will be distributed and dispersed within the chute 22. This dispersal of load helps prevent the chute 22 from deforming or warping when the chute 22 is held open during the bagging mode. The present invention therefore generally eliminates high localized loads imparted to the chute 22 that might cause the chute 22 to deform or warp.

The support members 34 and 38 shown in FIGS. 1–6 are but two embodiments of the present invention. Other shapes and locations of the support members could be utilized within the spirit of the present invention. For example, several finger members or support members could be provided that abut the chute 22 at a plurality of different locations, or the support member could provide a shape having a surface that abuts the chute 22 over a relatively large surface area. These other shapes and locations of the support member according to the present invention would also allow the load imparted to the chute 22 from the support members to be distributed or dispersed throughout the chute 22 such that high localized forces are eliminated. As described above, this helps reduce the chute's tendency to deform or warp while being held open during the bagging mode, and therefore the chute 22 would continue to function properly to direct clippings and materials downwardly as they exit the discharge opening 16 in the side discharge mode even after the mower has been operated for long periods of time in the bagging mode.

I claim:

1. A mechanism for use with a mowing vehicle having a mower deck within which vegetation and grass is cut, said mower deck including a discharge outlet through which cut grass and vegetation exit the mower deck, said mechanism comprising:

a discharge outlet chute pivotally coupled with the mower deck, and in a first position the chute extends outwardly from the discharge outlet for directing clippings discharged from the mower deck generally outwardly from the mower deck, and in a second position the chute is pivoted upwardly from the first position to generally expose the discharge outlet, a discharge conduit positioned for receiving clippings through the discharge outlet when the chute is in the second position, and a support member carried by the discharge conduit, said support member includes an elongate length which operatively supports the chute in the chute's second position, and the elongate length of the support member operatively supports the chute at a plurality of locations across a significant length of the chute for hindering deformation of the chute in the second position.

2. The invention of claim 1, wherein the support member extends laterally from the discharge conduit.

3. The invention of claim 1, wherein the discharge conduit directs clippings from the mower deck into a clippings collection container carried by the vehicle.

4. The invention of claim 1, wherein the chute is formed of a plastic material.

5. The invention of claim 1, wherein a top portion of the discharge outlet is formed in a top wall of the mower deck for allowing clippings to be directed upwardly through the discharge outlet and into the discharge conduit when the chute is in the second position, and the chute is positioned generally across and closes the top portion of the discharge outlet when the chute is in the first position.

6. The invention of claim 5, wherein the support member further comprises a cover which defines said elongate length and is operatively pivotally coupled with the mower deck, and in a first position the cover extends across and generally covers the top portion of the discharge outlet, and in a second position the cover is pivoted upwardly from the first position to generally open the top portion of the discharge outlet for allowing clippings to flow from the mower deck through the top portion of the discharge outlet and into the discharge conduit.

7. The invention of claim 6, wherein the support member further comprises a protruding member fixed with the discharge conduit and which operatively abuts the cover when the chute and cover are in their respective second positions, and the cover abuts the chute when the chute and cover are in their respective second positions and generally supports the chute across a significant length such that deformation of the chute is hindered in the second position.

8. The invention of claim 7, wherein the chute is formed of a plastic material, and the cover is formed of a generally rigid metal material.

9. The invention of claim 1, wherein said support member further comprises a protruding member fixed with the discharge conduit and which defines said elongate length and operatively supports the chute across a significant distance for hindering deformation of the chute in the second position.

10. A mechanism for use with a mowing vehicle having a mower deck within which vegetation and grass is cut, said deck including a discharge outlet through which cut grass and vegetation exit the mower deck, said mechanism comprising:

a chute pivotally coupled with the mower deck, the chute having a first position whereat the chute is positioned to extend outwardly from the discharge outlet for directing clippings discharged from the mower deck generally outwardly from the mower deck, and the chute has a second position whereat the chute is pivoted upwardly from the first position to generally expose the discharge outlet, a discharge conduit adapted for receiving clippings via the discharge outlet when the chute is in the second position, and the discharge conduit directs clippings from the mower deck into a clippings collection container carried by the vehicle, a support member which further comprises a protruding member carried by the discharge conduit, said protruding member comprises an elongate length which operatively engages the chute for supporting the chute in the second position, and the elongate length of the protruding member operatively supports the chute across a significant length for hindering deformation of the chute in the second position.

11. The invention of claim 10, wherein the chute is formed of a plastic material.

12. The invention of claim 10, wherein the support member extends laterally from the discharge conduit.

13. A mechanism for use with a mowing vehicle having a mower deck within which vegetation and grass is cut, said deck including a discharge outlet through which cut grass and vegetation exit the mower deck, said mechanism comprising:

a chute pivotally coupled with the mower deck, the chute having a first position whereat the chute is positioned to extend outwardly from said discharge outlet for directing clippings discharged from the mower deck generally outwardly from the mower deck, and the chute has a second position whereat the chute is pivoted upwardly from the first position to generally expose the discharge outlet, a discharge conduit adapted for receiving clippings via the discharge outlet when the chute is in the second position, said discharge conduit directs clippings from the mower deck into a clippings collection container carried by the vehicle, a support member carried by the discharge conduit, said support member includes an elongate length which operatively engages the chute for supporting the chute in the second position and for hindering deformation of the chute, wherein the support member causes the chute to be supported across a significant length for supporting the chute and generally hindering warping of the chute in the second position, and wherein a top portion of the discharge outlet is formed in the top wall of the mower deck for allowing clippings to be directed upwardly through the discharge outlet and into the discharge conduit, and the chute is positioned generally across the top portion of the discharge outlet when the chute is in the first position, wherein the support member further comprises a cover operatively pivotally coupled with the mower deck, and said cover defines said elongate length, the cover having a first position whereat the cover extends across and generally covers the top portion of the discharge outlet, and a second position whereat the cover is pivoted upwardly from the first position for generally opening the top portion of the discharge outlet, and the support member further comprises a protruding member fixed with the discharge conduit and which operatively abuts the cover in the second position, and the cover abuts the chute in the second position for generally supporting the chute across a significant length such that warping of the chute is generally hindered.

14. The invention of claim 13, wherein the chute is formed of a plastic material.

15. The invention of claim 13, wherein the protruding member extends laterally from the discharge conduit.

* * * * *